United States Patent
Klotz et al.

(10) Patent No.: US 12,432,102 B2
(45) Date of Patent: Sep. 30, 2025

(54) METHOD AND SENSOR BUS SYSTEM

(71) Applicant: Robert Bosch GmbH, Stuttgart (DE)

(72) Inventors: Albrecht Klotz, Leonberg (DE); Balint Nagy, Vecsés (HU); Dirk Schmid, Simmozheim (DE); Michael Schumann, Stuttgart (DE); Torsten Reiner, Aichtal (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

(21) Appl. No.: 18/570,248

(22) PCT Filed: May 30, 2022

(86) PCT No.: PCT/EP2022/064581
§ 371 (c)(1),
(2) Date: Dec. 14, 2023

(87) PCT Pub. No.: WO2022/268440
PCT Pub. Date: Dec. 29, 2022

(65) Prior Publication Data
US 2024/0283683 A1 Aug. 22, 2024

(30) Foreign Application Priority Data
Jun. 23, 2021 (DE) ...................... 10 2021 206 489.2

(51) Int. Cl.
*H04L 27/20* (2006.01)
*H04L 12/44* (2006.01)
*H04L 12/40* (2006.01)

(52) U.S. Cl.
CPC .......... *H04L 27/2014* (2013.01); *H04L 12/44* (2013.01); *H04L 27/2082* (2013.01); *H04L 2012/40273* (2013.01)

(58) Field of Classification Search
CPC . H04L 27/2014; H04L 12/44; H04L 27/2082; H04L 2012/40273;
(Continued)

(56) References Cited

U.S. PATENT DOCUMENTS

2013/0124763 A1 5/2013 Kessler
2015/0012678 A1 1/2015 Levy et al.
(Continued)

FOREIGN PATENT DOCUMENTS

DE 10037996 A1 2/2002
DE 102008010438 A1 8/2009
(Continued)

OTHER PUBLICATIONS

International Search Report for PCT/EP2022/064581, Issued Sep. 28, 2022.

*Primary Examiner* — Richard Tan
(74) *Attorney, Agent, or Firm* — NORTON ROSE FULBRIGHT US LLP

(57) ABSTRACT

A method for transmitting data in a sensor bus system and a sensor bus system. The sensor bus system includes an electronic controller, a plurality of sensors, and a twisted two-wire line between the electronic controller and the sensors, wherein the electronic controller is designed to supply electrical energy to the sensors via the twisted two-wire line, and the sensors are designed to transmit received information to the electronic controller in an I/Q-modulated manner via the twisted two-wire line.

11 Claims, 9 Drawing Sheets

(58) Field of Classification Search
CPC ........... H04L 27/2053; H04L 12/40026; H04L 12/10; H04L 12/40045; H04Q 2209/30; H04Q 2209/88; H04Q 9/00
USPC ........................................................ 332/100
See application file for complete search history.

(56) References Cited

U.S. PATENT DOCUMENTS

| | | | |
|---|---|---|---|
| 2016/0034416 | A1 | 2/2016 | Chavez et al. |
| 2017/0199066 | A1* | 7/2017 | Foo ....................... G01F 23/284 |
| 2019/0138018 | A1 | 5/2019 | Cave |

FOREIGN PATENT DOCUMENTS

| | | | |
|---|---|---|---|
| DE | 102011114527 | B4 | 5/2014 |
| EP | 2412135 | B1 | 7/2013 |
| EP | 3441832 | A1 | 2/2019 |
| JP | 2009055306 | A | 3/2009 |
| JP | 2012199830 | A | 10/2012 |
| WO | WO2014111920 | * | 7/2014 |

* cited by examiner

Fig. 6
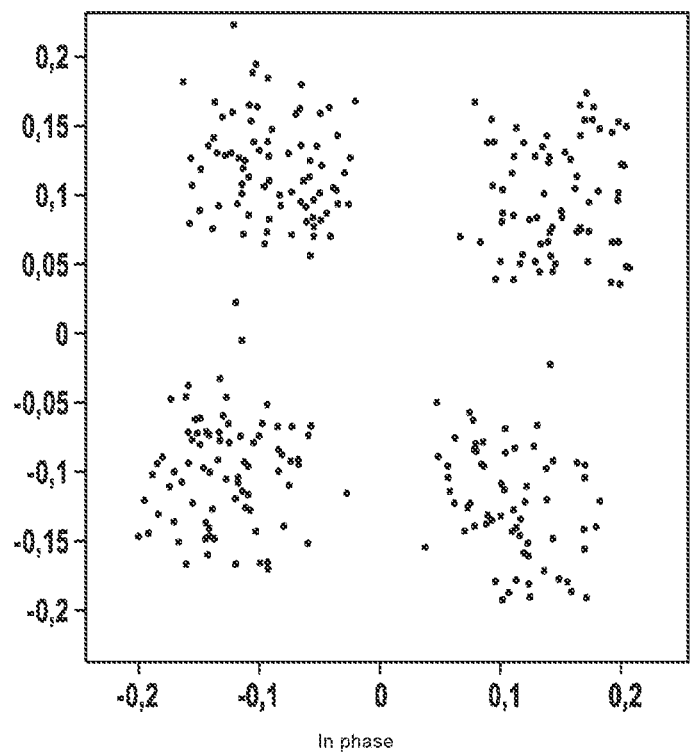
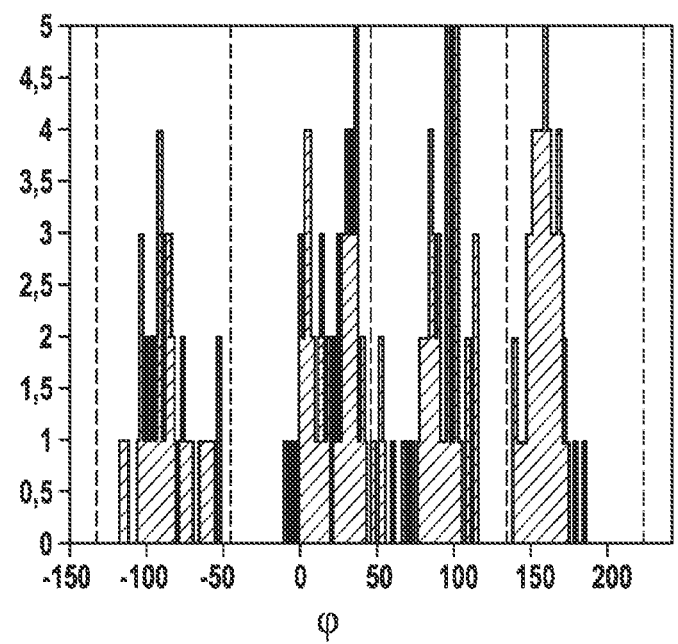

Fig. 7
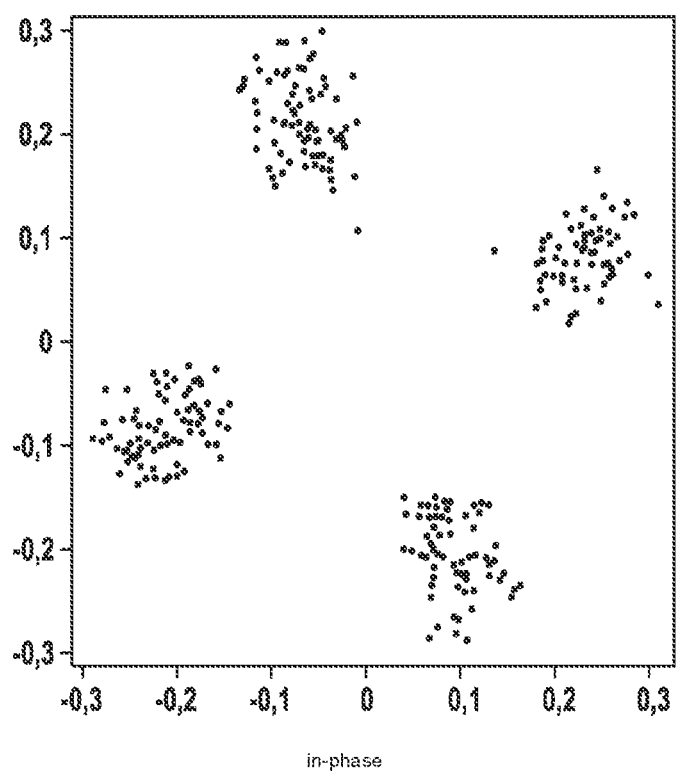
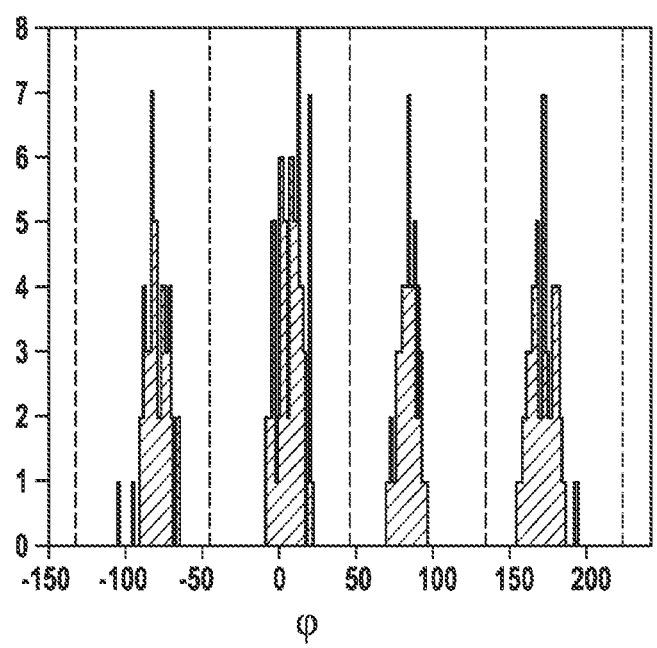

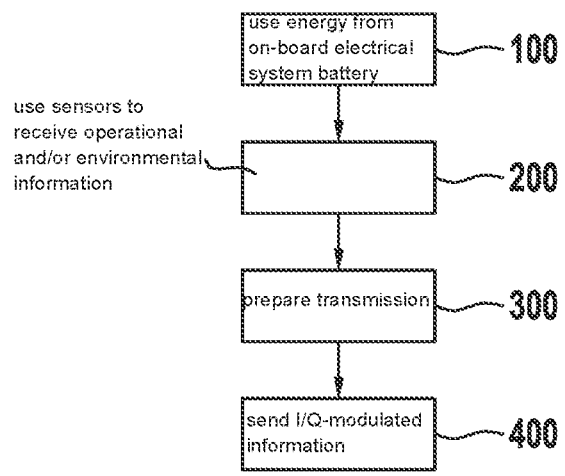

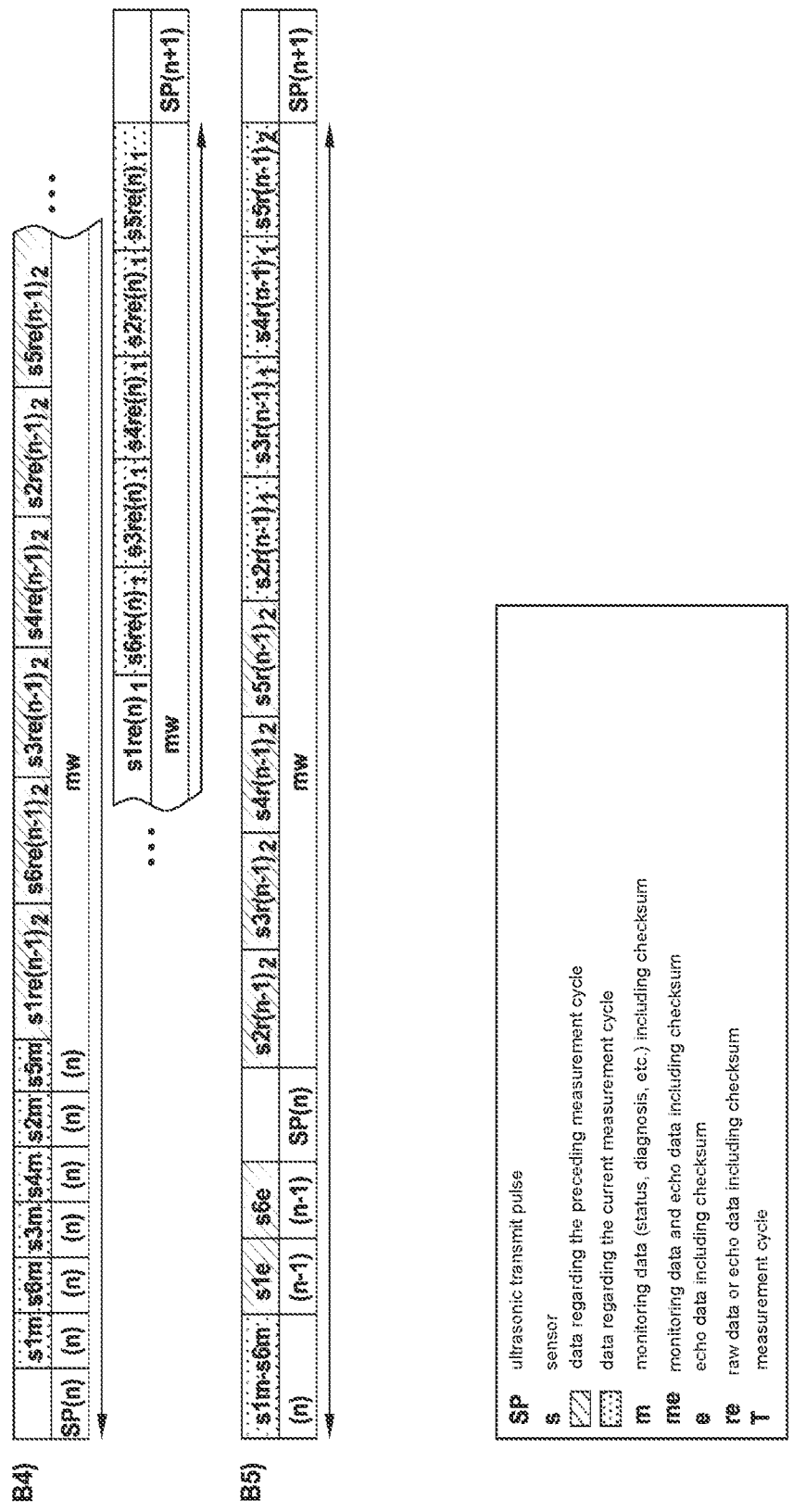

METHOD AND SENSOR BUS SYSTEM

FIELD

The present invention relates to a method for data transmission in a sensor bus system and to a corresponding sensor bus system. In particular, the present invention relates to a cost-effective topology for automotive applications.

BACKGROUND INFORMATION

In order to reduce the complexity of an ultrasonic sensor system for object detection in road vehicles and to save cabling costs, the aim is to replace the currently prevailing star-shaped topology with a bus topology. Typically, six sensors are installed on each side of the vehicle (front or rear bumper), which are then no longer connected to the controller via separate data lines, but are connected to a common data bus. Preferably, the supply of power to the sensors from the controller should also take place via the bus lines in order to minimize the number of lines.

The majority of the data to be transmitted is made up of the echoes received by the sensors with their attributes and accompanying information, which are transmitted to the controller. This means that roughly six times the amount of data must flow via the bus per measurement cycle than via a single sensor data line with a star-shaped topology if the system performance is to be kept comparable. At the same time as increasing the amount of data to be transmitted, however, the costs for data transmission should not increase significantly.

In principle, a linear or ring-shaped topology would require a six-fold increase in the data rate on the bus. Since a sensor wired in star-shaped fashion generates approx. 1000 data bits of echo information for a given performance and this information is transmitted in a pause of approx. 5 ms between two consecutive measuring cycles of approx. 30 ms length, a data rate of approx. 200 kbit/s is required for a star-shaped topology. This data rate is possible with technical systems using current modulation methods that work with NRZ coding (non-return to zero, simple 0/1 bit coding) with 8B9B channel coding (Bosch ultrasonic sensor generation 6 with UI interface, based on PSI5 standard).

The bus system would have to transmit approx. 1.2 Mbit/s at six times the data rate. Existing interface standards for such high data rates are CAN and Ethernet, for example, but these are cost-intensive.

A further requirement for sensor systems is the signal propagation times, in order to ensure that the information received at the controller is sufficiently up-to-date. In other words, the average measurement cycle time must not be increased excessively, in order to avoid having to accept a degradation in performance compared to the related art. Finally, systems in the related art also sometimes have the property that no data can be sent via the bus during an echo reception window in the measurement cycle, as the signals sent via the bus could interfere electromagnetically with the received ambient signals and the signal-to-noise ratio could suffer from simultaneous processing.

In summary, cost-effective sensor bus systems can be set up with low data rates, but for this purpose data communication must also take place during the echo receiving window (ERW). Although it is possible to reduce the noise level by increasing the data rate, this is not possible to a sufficient extent at reasonable cost with today's standard encodings (e.g., Manchester).

SUMMARY

According to the present invention, a sensor bus system is provided which can be designed in particular for aeronautical or automotive applications. According to an example embodiment of the present invention, the system comprises an electronic controller which can be connected to an on-board power supply system (e.g. traction battery or on-board battery). The electronic controller supplies a plurality of sensors of the sensor bus system with electrical energy via this energy source. This takes place via a twisted two-wire line between the electronic controller and the sensors. The sensors can be regarded as smart sensors, for which purpose they can have logic for signal evaluation or signal processing. For example, they can have an FPGA or an ASIC or comprise a microcontroller or signal processor. Mixed forms of the aforementioned designs are also possible. The electronic controller forwards the electrical energy proportionally to the sensors via the twisted two-wire cable of the sensor bus system. The two-wire line can in particular have two copper cores. For communication between the electronic controller and the sensors, information ascertained by the sensors (e.g. received from the environment or otherwise measured) is I/Q-modulated in accordance with the present invention and sent to the electronic controller via the twisted two-wire line. I/Q modulation can ensure a sufficiently high data rate even with a linear structure or a ring structure (i.e. not a star structure) of the sensor bus system for communication of the sensor data originating from the environment or from operation to the electronic controller, even if the sensors transmit to the electronic controller using the time-division multiplex method. In addition, the electromagnetic compatibility of bus communication can be improved with regard to the reception of ultrasonic signals, for example. Dispensing with a star structure also makes it possible to reduce the overall length of the twisted pair line.

Preferred developments of the present invention are disclosed herein.

According to an example embodiment of the present invention, the sensors can, for example, be ultrasonic sensors which, in the case of road vehicles, are frequently located in the bumpers and/or the mud guards and/or the exterior mirrors in order to collect and signal information about objects in the environment. Similar sensors are also provided independently of the ultrasound spectrum by microphones/sound sensors, in order to evaluate information about rolling noises or other ambient noises and to draw inferences about the driving situation and the vehicle condition. In addition, acceleration sensor clusters for early crash detection are now being used as peripheral acceleration sensors, which enable safety components in the outer skin of a road vehicle to be prepared for a possible crash (verified at a later time) at a very early stage in the event of a crash. Near range radar sensors could also benefit from the present invention, as they have requirements similar to ultrasonic sensors in terms of power supply performance, data rates, and manufacturing costs. Preferably, the I/Q modulation can comprise PSK (phase-shift keying) and in particular quadrature phase-shift keying (QPSK), 8-PSK or 16-PSK. Preferably, differential phase shift keying (DPSK) or quadrature amplitude modulation (QAM) can also be provided as I/Q modulation. The fundamental frequency of the modulation can in particular be significantly above the 50 KHz band usually used for ultrasound-based ambient detection, and in particular can be 100 kHz or higher. The spectrum resulting from the modulation of the carrier then contains only a low power density in the 50 kHz band. In particular, all sensors connected to the electronic controller via the twisted two-wire line can use a different fundamental frequency for the I/Q modulation in order to carry out simultaneous data transmission above the ultrasonic band. In this way, a time-division multiplexing process can be dispensed with if necessary, thus increasing the average data rate compared to the related art.

In order to compensate for the attenuation properties of the twisted two-wire line, the I/Q-modulated signal can either be pre-distorted on the transmitter side, i.e., in the relevant sensor, or alternatively or additionally, subsequent (receiver-side) attenuation compensation can be carried out in the electronic controller. An equalizer can be used for this purpose, which eliminates (at least partially) the influence of the attenuation of the twisted two-wire line. This can reduce the detection rate or the energy required for sufficient signal quality.

According to an example embodiment of the present invention, the sensors can be designed to transmit the received information in an I/Q-modulated manner to the electronic controller during reception of (ambient) signals (i.e. sound, ultrasound, acceleration, or the like). In particular, a continuous data transmission between the sensor and the electronic controller can ensure that the information arriving at the electronic controller is as up-to-date as possible.

In order to facilitate synchronization of the electronic controller and the bus signals sent by the sensors, the electronic controller can be designed to transmit an amplitude-modulated carrier signal via the two-wire line to the sensors. From this carrier signal, the sensors can generate a clock for the signals to be transmitted, or can modulate the carrier signal directly corresponding to the information received, using I/Q modulation. The carrier frequency or carrier frequencies can be in a frequency range between 60 kHz and 500 KHz. For example, with six sensors, the carrier frequencies can have a spacing of approx. 65 to 80 kHz. The assignment can be made by the electronic controller when the sensor bus system is commissioned.

Further embodiments and features which can be used in embodiments according to the present invention are disclosed below. These embodiments are to be understood as merely exemplary and are in no way to be interpreted as limiting or expanding the scope of protection of the present invention.

According to an example embodiment of the present invention, a sinusoidal carrier signal is used for data transmission, which is modulated with the data stream in the sensor. The modulated signal is received and demodulated in the controller in order to recover the data stream. Among the many possible modulation types, such as frequency, phase or amplitude modulation, digital phase modulation in the form of an I/Q modulation is particularly suitable for fulfilling the present requirements.

When using quaternary phase modulation (QPSK) or one of its variants (offset QPSK or differential QPSK), the power density spectrum of the generated bandpass signal can be shaped with a suitable choice of carrier frequency and symbol rate so that significant power is only generated above 60 kHz and, with simultaneous suitable pulse shaping of the symbols, the spectrum can also upwardly be kept below the interference-sensitive medium-wave range, which starts at 500 kHz. In this design, the data rate is 500 kBit/s at 250 kbaud.

The spectral efficiency is better here than in conventional Manchester coding. It can be further improved by higher-order phase modulation. For example, with 8-PSK (3 bits are coded into one symbol each, where the phase position between neighboring symbols differs by 45°) it is 50% higher than with QPSK (90° phase difference between adjacent symbols).

The concentration of signal energy on a defined frequency band allows data transmission via a bus line, which is also used to supply power to the sensors.

With (differential) voltage modulation, decoupling capacitors and coils can be used to spectrally separate low-frequency power supply and higher-frequency data transmission. With current modulation, the crosstalk of the modulation into the ultrasonic reception channel is not disruptive, as there is no significant signal power below 60 kHz. Higher frequency components do not contribute to noise in the ultrasonic reception channel. Here, decoupling capacitors and coils can be dispensed with, which keeps hardware costs to a minimum.

Possible variants:

Further possibilities for designing objects according to the present invention are described below by way of example.

The transmittable data rate can be increased for a given bandwidth of the available channel by increasing the order of the modulation process. For example, 8-PSK allows the coding of 3 bits each in a symbol, where the symbols have a phase angle of 45° from each other. With 16-PSK, 4 bits per symbol can be transmitted, which doubles the data rate compared to QPSK.

Increasing the order also increases the decoding effort in the receiver, because the distances between the symbols decrease and greater precision is required for signal processing, while at the same time susceptibility to electromagnetic interference from the environment of the system or vehicle is greater.

The use of differential phase modulation, in which the information is encoded in the difference between the phase angle and the preceding symbol, is particularly advantageous and cost-saving. This eliminates the need for time-consuming detection of the absolute phase angle in the receiver, thus making phase-locked synchronization of the receiver with the transmitter unnecessary.

To further increase the data rate, it is also possible to use combined phase and amplitude modulation (so-called higher-order QAM modulation), although this increases the effort in the decoding.

The phase-locked synchronization required for this of the demodulator to the carrier frequency of the transmitter is particularly complex. This is usually achieved with the aid of a synchronization algorithm in the receiver, which adjusts the sampling frequency by means of a phase-locked loop.

Such a synchronization algorithm could be dispensed with if, in a further advantageous embodiment of the present invention, the carrier frequency is generated by the receiver (controller) and transmitted to the transmitter (sensor). This transmission can be carried out in the form of voltage modulation on the bus line, which takes place simultaneously with the current modulation of the data transmission by the sensor.

It is also advantageous to compensate for the previously measured amplitude and phase response of the transmission medium (e.g. twisted core pair) in the receiver by using a corresponding equalizer. This cancels the amplitude and phase distortions before the symbols are sampled, which increases the robustness of the method against other interference.

According to an example embodiment of the present invention, the sensors (transmitters) connected to the bus can either share the transmission medium using the time-division multiplex method or can be operated using the frequency-division multiplex method. In this case, each transmitter receives a different carrier frequency within the available frequency band and transmits simultaneously with all other sensors. The symbol rate is reduced in accordance with the number of transmitters in order to reduce the bandwidth of the generated signals to an extent such that the spectra do not overlap one another. In the receiver, the transmitters are selected by spectral filtering of the received signal by means of bandpass filters before the demodulation of the individual data streams.

According to an example embodiment of the present invention, the physical realization of both the modulation and the demodulation method is preferably carried out by digital signal processing. The implementation can optionally take place in software which runs on a signal processor or microcontroller, or in the form of digital hardware on an ASIC or FPGA within the corresponding sensor (in particular ultrasonic sensor) or receiver (controller). Mixed forms are also possible.

The application of the method is not limited to ultrasound systems. It can be used in many other sensor systems, e. g., road noise sensing systems, near range radar sensors, and airbag systems (peripheral acceleration sensors). Among other things, the carrier frequency and symbol rate can be adapted to the particular requirements.

According to an example embodiment of the present invention, preferably, the controller assigns to the individual sensors dynamic time windows in which communication should or is permitted to take place. Specifications of the data content that should be/is permitted to be communicated can also be dynamically assigned to the sensors. For this purpose, the sensors can have already-stored data sets that define the different behaviors with regard to the reception of environmental signals, their evaluation, and the communication of the environmental signals or information obtained on the basis of the environmental signals. In this way, the communication for adapting the behavior of the sensors can be kept to a minimum by the electronic controller. In other words, the behaviors are activated in a sensor-specific manner by the controller without the need to also communicate the content for defining the behaviors via the twisted pair cable.

The behavior can also be predefined in such a way that portions of the received raw data are transmitted substantially unchanged via the twisted two-wire line to the electronic controller, while other portions are evaluated in the sensor and results of the evaluation are transmitted to the electronic controller via the twisted two-wire line. In particular, it can also be communicated as a behavior that a particular sensor should not send any data at all via the bus or the twisted pair cable in a certain operating state or when prespecified events occur.

According to a second aspect of the present invention, a method for data transmission in a sensor bus system is provided in which a plurality of sensors are connected to an electronic controller in terms of information and energy via a twisted two-wire line. According to an example embodiment of the present invention, the sensors are fundamentally supplied with energy (vehicle electrical system voltage, battery voltage, etc.) by the electronic controller. The sensors are supplied with energy via the twisted two-wire cable, which is also used to transmit information in the sensor bus system. When the sensors have ascertained environmental information or other sensor data, these data are I/Q-modulated in accordance with the present invention and sent by the sensors to the electronic controller via the twisted two-wire line. I/Q modulation makes it possible to select bus topologies (in particular linear or ring-shaped buses) that could not be used in the related art due to the inadequate data rate achieved there. In this way, the line length can be reduced and the wiring outlay of a sensor bus system can be reduced in the manner according to the present invention.

BRIEF DESCRIPTION OF THE DRAWINGS

Exemplary embodiments of the present invention are described in detail below with reference to the figures.

FIG. 6 shows a constellation diagram and a histogram of the phase position of the symbols in the receiver (electronic controller) without an equalizer.

FIG. 7 shows a constellation diagram and a histogram of the phase position of the symbols in the receiver (electronic controller) after the equalizer.

FIG. 8 shows a flow chart illustrating steps of an exemplary embodiment of a method according to the present invention for data transmission in a sensor bus system.

FIGS. 9A and 9B shows timing diagrams of different exemplary embodiments of the present invention.

DETAILED DESCRIPTION OF EXAMPLE EMBODIMENTS

Figure 1:
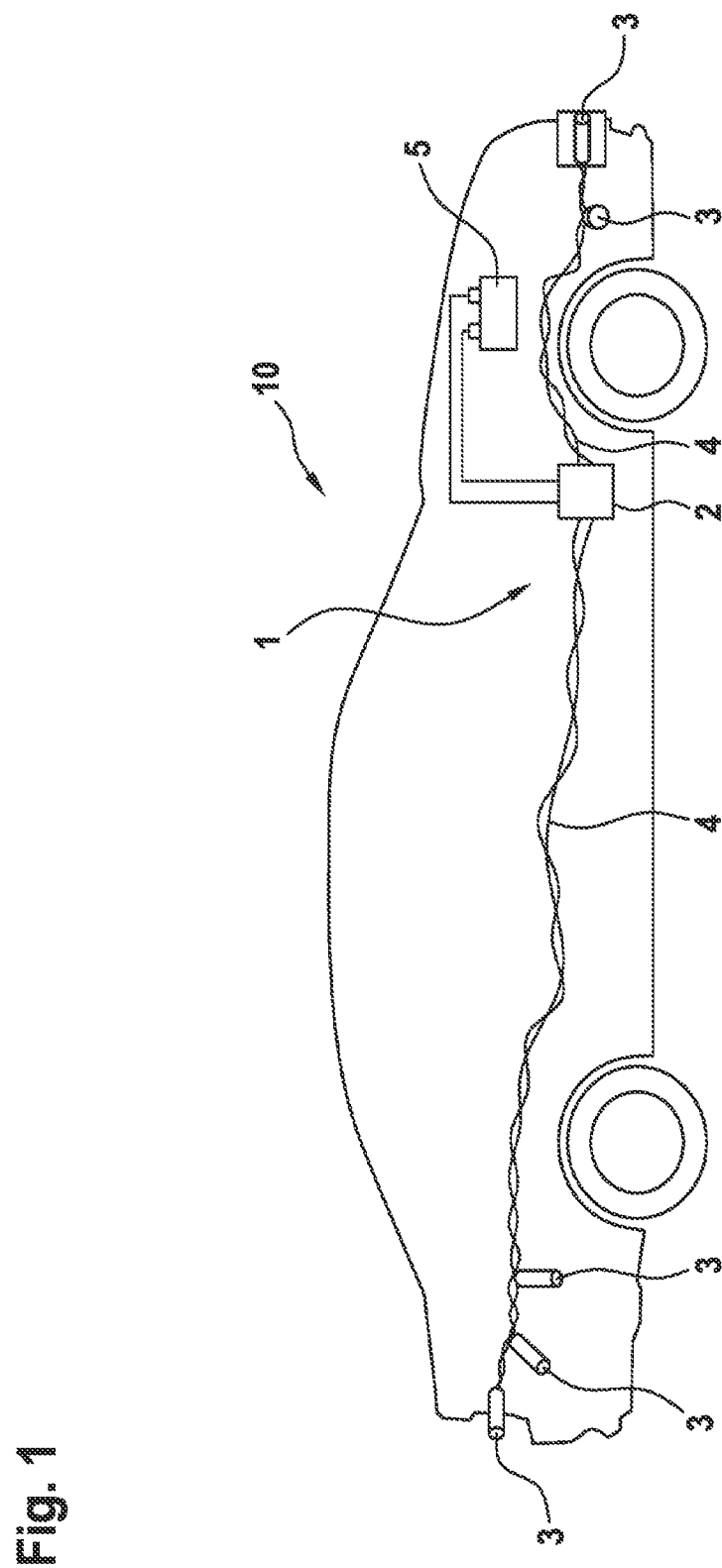
FIG. 1 is a schematic representation of a means of transport having a sensor bus system designed according to the present invention.

FIG. 1 shows a passenger car 10 in which an exemplary embodiment of a sensor bus system 1 according to the present invention is arranged. The sensors 3 are arranged as ultrasonic sensors in the front bumper and in the rear bumper and are connected to an electronic controller 2 via a twisted two-wire cable 4 in terms of information and energy. Both the electronic controller 2 and the sensors 3 are supplied with electrical energy via a starter battery 5.

Figure 2:
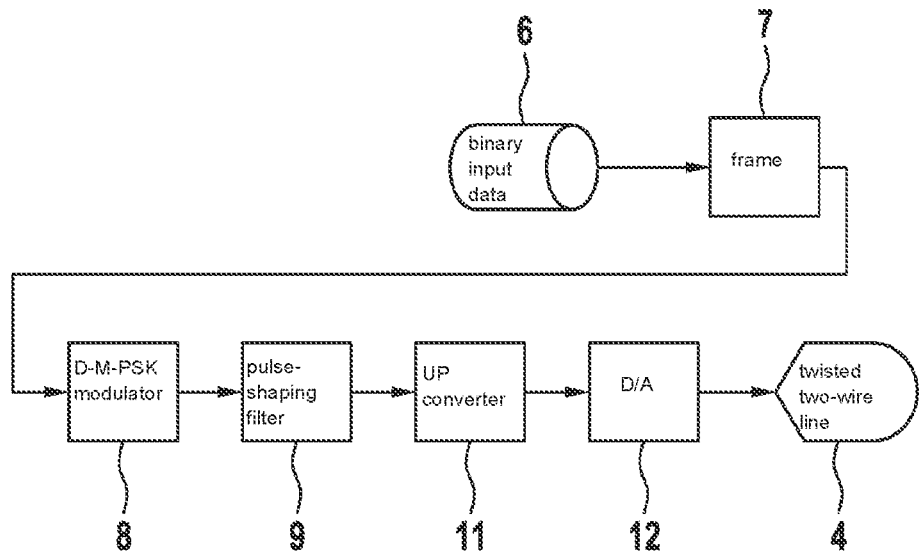
FIG. 2 is a schematic representation of the components of a sensor that can be used according to the present invention in the form of an ultrasonic sensor.

FIG. 2 shows components of a transmitter (reference sign 3 in FIG. 1). Binary input data 6 are sent as a binary data stream to a frame 7, where they are provided with a preamble and a cyclic redundancy check is enabled. The data are then fed as binary words to a D-M-PSK modulator 8, which converts them into complex-valued symbols. In the case of a QPSK, a data word made up of two bits results in a symbol. The transitions between the symbols are smoothed using a pulse shaping filter 9, which largely suppresses harmonics in the resulting spectrum. In the UP converter 11, the complex baseband signal is converted by multiplication with a carrier frequency into a real bandpass signal, which is applied to the data line as a modulated current after a digital/analog converter 12.

Figure 3:
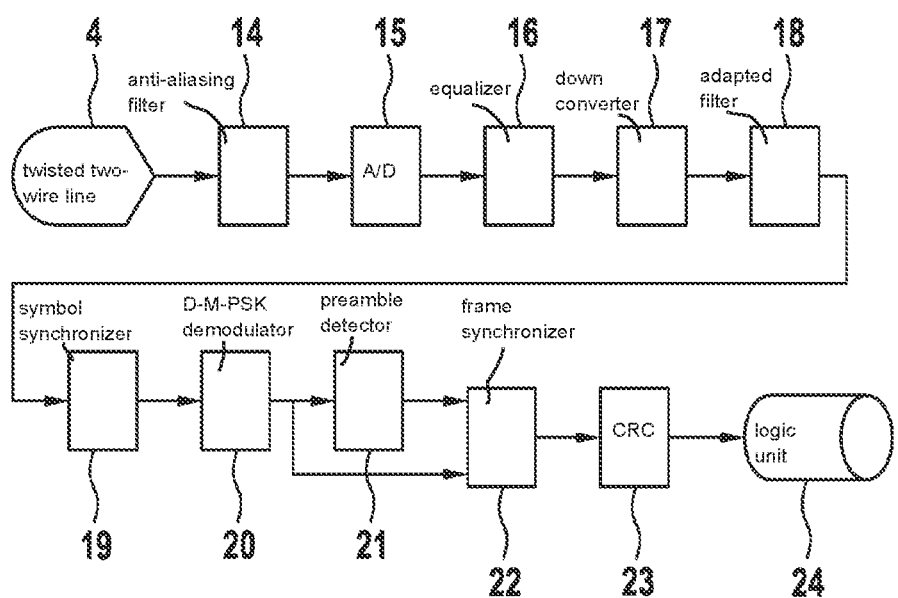
FIG. 3 is a schematic representation of components of a receiver in the form of an electronic controller.

FIG. 3 shows components of a receiver in the form of an electronic controller which is connected to the twisted two-wire line 4. From here the receiver receives the analog input signal, which is bandpass-filtered by the two-wire line 4. After an anti-aliasing filter 14, the bandpass-filtered signal is fed to an analog/digital converter 15, which in the example has a resolution of >five bits. The digital output signal of the analog/digital converter 15 is fed to a down-converter 17 after passing through an equalizer 16, which has an infinite impulse response (IIR) filter and a finite impulse response (FIR) filter. Here the received signal is transformed into the complex baseband by multiplication with the carrier frequency. This is then fed to an adapted filter 18 which suppresses the high-frequency spectral signal components, for which purpose it is adapted to the pulse shape and acts as a low-pass filter. The symbol synchronizer 19 synchronizes the sampling of the symbols with the data stream with regard to frequency and optimum sampling time. The scanned symbols are demodulated in a D-M-PSK demodulator 20 and the frames are separated from each other in a frame synchronizer 22 using the preamble bit sequences detected in a preamble detector 21. With the aid of a cyclic redundancy check (CRC) 23, the CRC checksum bits are checked and corrected with regard to any transmission errors. Optionally, the CRC 23 can also be replaced by a block code, which also enables automatic error correction, if the block code used supports this. The output data of the CRC 23 are supplied to the logic unit 24 of the receiver, and the findings obtained here can be used for driver assistance or autonomous driving.

Figure 4:
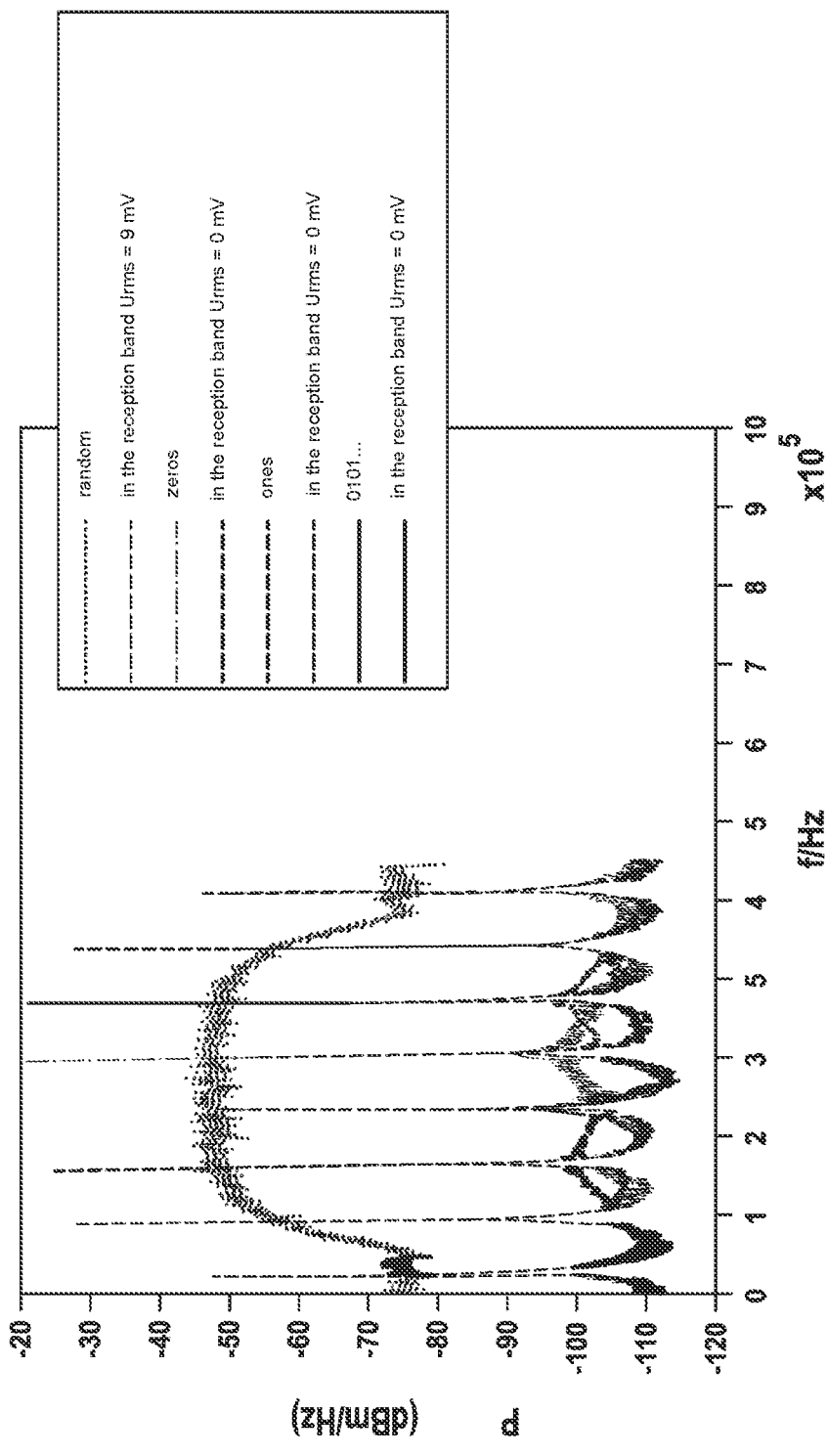
FIG. 4 shows a power density spectrum of the modulated current signal at the output of a sensor.

FIG. 4 shows an exemplary power density spectrum which has the current signal modulated with D-QPSK at the output of the sensor (reference sign 3 in FIG. 1). The concentration of the signal power in a frequency range between 100 kHz and 400 kHz is clearly recognizable, while the sensitive frequency bands below 60 kHz and above 500 kHz are not significantly occupied. The power density is plotted on the ordinate and the frequency in Hz is plotted on the abscissa.

Figure 5:
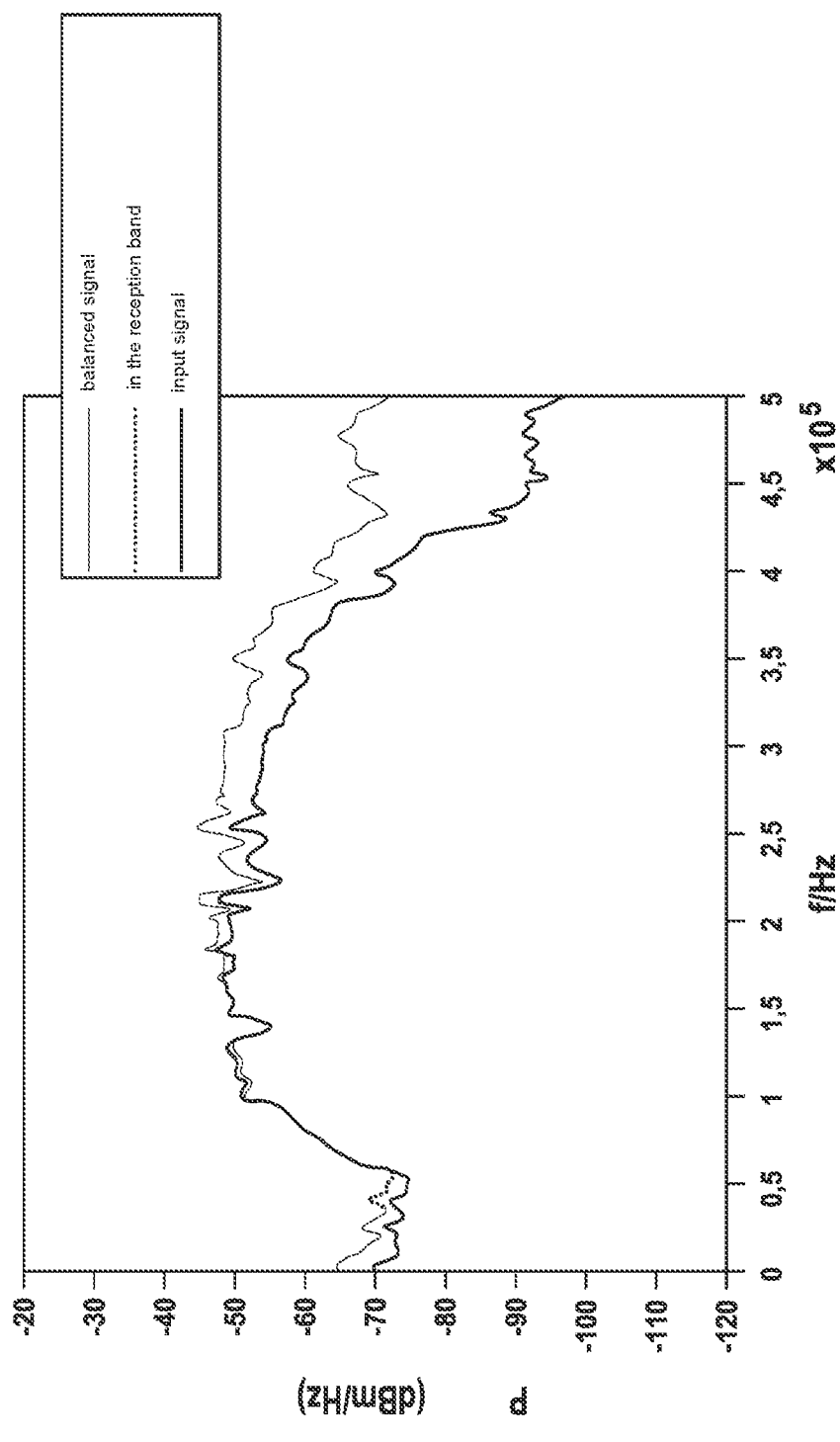
FIG. 5 shows a power density spectrum of the D-QPSK signal at the input of the receiver and after the equalizer.

FIG. 5 shows the power density spectrum of the D-QPSK signal at the input of the electronic controller compared to the signal obtained after the equalizer. The modulated signal generated by the sensor is attenuated during transmission via the bus line, wherein higher frequencies are usually attenuated more than lower frequencies. This corresponds to a low-pass characteristic of the twisted two-wire line. Additional sensors connected thereto also contribute to the low-pass characteristic with their capacitive load. The attenuation of the amplitude is accompanied by a phase shift of the signals, which increases with the frequency. Without an equalizer in the electrical controller (receive path or receiver), decoding of the symbols would in some cases be possible only to an imperfect extent, as the pulse shape would be distorted and inter-symbol interference would prevent reliable separation of the symbols. This relationship is shown in FIG. 6.

FIG. 6 shows a constellation diagram and histogram of the phase position of the symbols in the receiver without an equalizer. In the upper diagram, the quadrature is plotted over the in-phase, while in the lower diagram the synchronized demodulation histogram at 250 kbaud=$F_0$ is plotted over the angle. An equalizer in the receiver that is adapted to the transmission function (all-pass filter in combination with high-pass filter) can reverse the distortion caused by the channel (the bus line) and the symbols can be successfully decoded without errors. This relationship is plotted in FIG. 7.

FIG. 7 shows a constellation diagram and a histogram of the phase position of the symbols in the receiver (electronic controller) after treatment by the equalizer. In the upper diagram, the quadrature is plotted over the in-phase, while in the lower diagram the synchronized demodulation histogram at 250 kbaud=$F_0$ is plotted over the angle. Due to the treatment by the equalizer, the distortion caused by the channel (twisted two-wire line) can be reversed and the decoding of the symbols is successfully done without errors.

FIG. 8 shows steps of an exemplary embodiment of a method according to the present invention for data transmission in a sensor bus system in which a plurality of smart sensors and an electronic controller are connected to one another in terms of information and energy by a twisted two-wire line. In step 100, energy from an on-board electrical system battery is used, by means of the electronic controller, to supply the sensors with electrical energy required for their operation and for communication. This takes place via the twisted two-wire line. In step 200, the sensors are used to receive operational and/or environmental information. The sensors prepare the transmission via the twisted pair cable in step 300 by I/Q modulation of the information, and send the I/Q-modulated information to the electronic controller via the twisted pair line in step 400. Due to the increased data rate compared to the related art, a linear or ring-shaped bus topology can be used, whereas the related art always requires a star-shaped topology between the sensors and a (central) controller.

Figure 9A:
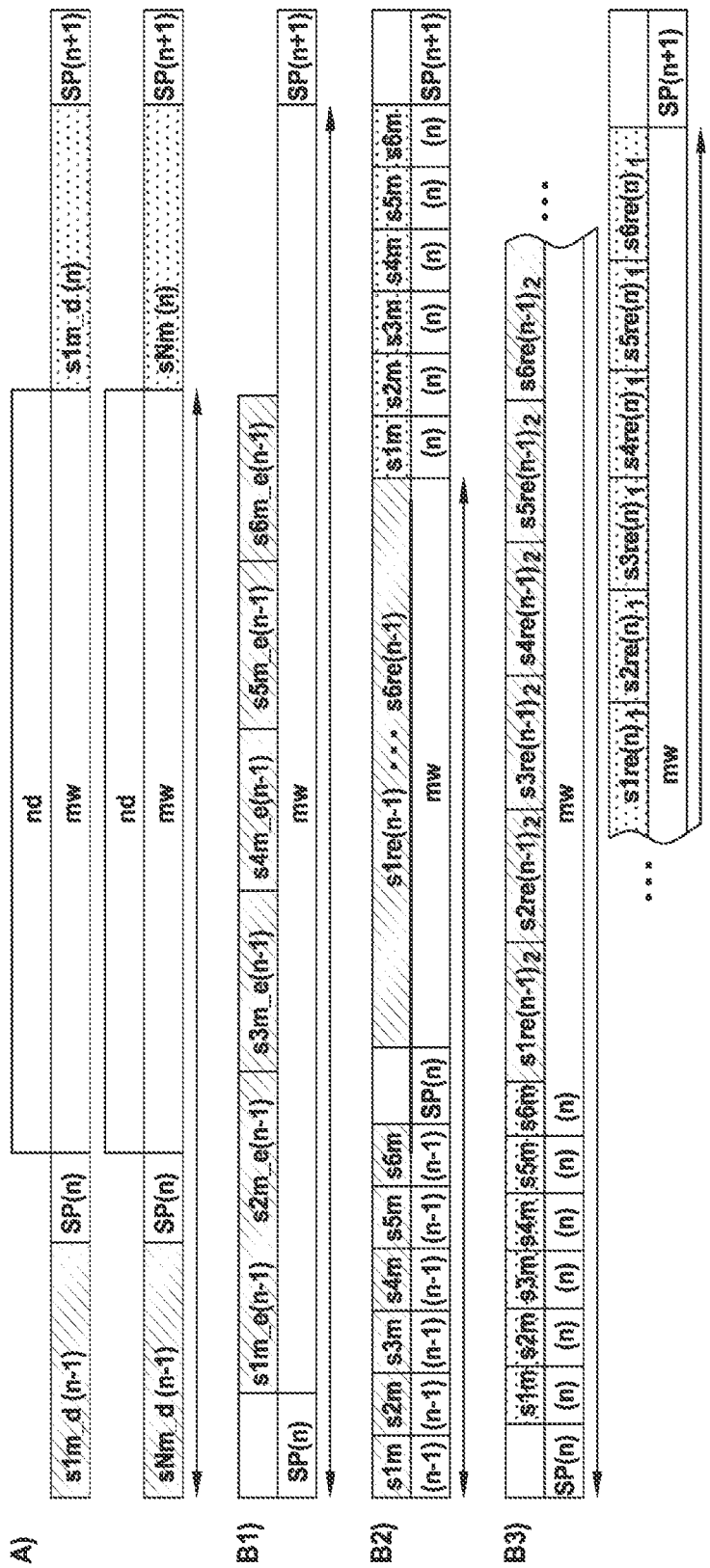

FIGS. 9A and 9B shows timing diagrams of different exemplary embodiments of the present invention.

In FIGS. 9A and 9B the embodiments according to the present invention are shown by way of example and are described in detail below.

Partial diagram A) shows a typical measurement cycle of point-to-point system in current use today.

Measurement cycle T2 begins with the transmission of the sensor data, including monitoring/diagnostic variables and checksums slm_d(n-1), followed by the transmission request and the ultrasonic transmission pulse SP(n) * and the subsequent echo reception in the measurement window. The measuring cycle then starts again from the beginning. The scheme is applied in parallel for all N sensors in the system. A sensor can also be only a (cross-echo) receiver. In this case, a different action can be carried out in the sensor in the phase marked SP.

The duration of the data communication phase is determined by the available data rate and the number of bits to be transmitted. In typical systems, this phase lasts up to 5 ms at around 200 kBit/s. The measurement window is substantially determined by the sound propagation time and the required measurement range, and is approximately 30 ms at a range of 5*m*. That is, the communication window is significantly shorter compared to the measurement window. A disadvantage of current systems, besides the prolongation of the measuring cycle, is that there is a latency of up to one complete measuring cycle between echo detection and data transmission.

The method proposed here can be used for data rates>500 kBit/s.

Further communication schemata for the method according to the present invention are shows in subdiagrams B1) to B5).

In bus operation, the following schemata are proposed according to the present invention:

B1) Optimization of the measurement data repetition rate

In this measurement mode, the measuring cycle is shortened due to the fact that the individual sensors communicate one after the other during echo reception. An additional communication window outside of the measurement operation is omitted. Advantageously, the complete data packets of a sensor are transmitted completely before it is the turn of the next sensor, in order to achieve the best possible utilization of the net data rate. Disadvantageous here is the latency of up to almost two (shortened) measurement cycles (if, in the example shown, echoes from sensor 6 were detected at the beginning of cycle (n-1) but are not transmitted until the end of cycle(n)).

B2) Optimization for maximum bandwidth utilization

Under the boundary condition that the total measurement cycle time should not be lengthened compared to a currently used system, while at the same time the entire communication time is utilized, B2) is a suitable solution. The communication windows per sensor can also be of different lengths if different data contents are to be communicated. This mode is suitable for raw data transfer, for example. The sensor status or the monitoring variables are sent between measurement cycle (n-1) and (n) to reduce error tolerance times. The sensor (raw) data from the previous cycle is transferred in full in the measurement window of the subsequent cycle. Variant B2) can use a rigid timing scheme, but also generates a latency in the transmitted sensor data.

B3) Latency-minimized transmission

In contrast to B1) and B2), in this mode data from the current cycle and previous cycle are transferred. First, the monitor and diagnostic information from the current cycle is transmitted for each sensor, i.e. the sensor self-diagnosis takes place during the phase marked "SP." This is followed by the transfer of the remaining data from the previous cycle. This is followed by the transmission of the echoes that have already been detected, or raw data from the current cycle, until the start of the data transmission. This mode minimizes the latency for monitoring and diagnostic information by one measurement cycle compared to today, as well as for the echoes detected in the near-medium distance range. This mode is appropriate in particular for safety-relevant applications in which short error tolerance times and low latency are important.

B4) Optimized for functions at higher speeds

Whereas in B1) to B3) the order of the sensors that transmit the data was shown in ascending order without restriction of generality, B4) and B5) emphasize that the order of the time slots in which the sensors can communicate can be assigned variably. For a USS system, it is advantageous e.g. at higher speeds, when the parking space measurement or blind spot detection is active, that the corner sensors S1 and S6 can transmit their data with priority (B4). Or more generally: speed or function-dependent assignment of the transmission sequence of the bus users and the data content.

B5) Optimized for functions that require raw data transmission in the front area In variant B5), the basic idea is that some functions benefit if raw data evaluation of sensors in the controller is possible, but at the same time the transmission bandwidth is so limited that not all sensors can transmit raw data. It is proposed, for example, to transmit in a bandwidth-saving manner the echo data of the corner sensors evaluated in the sensor, and the raw data from the middle sensors. Here, up to the middle of the measurement window, the data from the previous cycle (echoes and "second half of the raw data) are transmitted, as well as the raw data from the distance range up to the middle of the measurement window (approx. 2.5 m). Monitoring variables are transferred from the current cycle. A slight increase in the measuring cycle time is accepted in this case.

More generally, this can be formulated as follows:

The type of data (echo or raw data) as well as the time slot available for this and, in the case of raw data, the time range can be varied dynamically from cycle to cycle. In addition, there can also be mixed operation of echo and raw signal data transmission.

i. In this way, it would also be possible to deliberately not assign a slot to specific sensors, i.e. sensors that could possibly be dispensed with in the current measurement (e.g. the remote echo sensor). These sensors would then transmit only status data.

ii. In the case of raw data, the time section could be configured variably so that, for example, at higher speeds only the clutter area or only the long range is transmitted (for road condition estimation) or the immediate near range is not transmitted. For example, at low speeds data relating to the long-distance range can be excluded from transmission, because at low speeds the long-distance range is not relevant to collisions.

iii. A combination is also possible: For example, the oscillation of the sensor and the echoes can always be transmitted. Alternatively or additionally, the clutter region or the noise region can always be transmitted in addition to the echoes.

In summary, it can be said that, on the basis of the method according to the present invention for data transmission, new possibilities result for ultrasound-based driver assistance systems with regard to flexibility (selection via a priori configuration and/or during running operation) and design of the bundling and temporal arrangement of data packets.

The invention claimed is:

1. A sensor bus system, comprising:
an electronic controller;
a plurality of sensors; and
a twisted two-wire line between the electronic controller and the plurality of sensors, wherein the electronic controller configured to supply the plurality of sensors with electrical energy via the twisted two-wire line, and wherein the plurality of sensors are configured to transmit received environmental information to the electronic controller in an I/Q (in-phase/quadrature)-modulated manner via the twisted two-wire line,
wherein the twisted two-wire line connects the electronic controller and the plurality of sensors via a ring structure or a linear structure, in terms of information technology and energy,
wherein the plurality of sensors include ultrasonic sensors,
wherein the I/Q modulation uses a fundamental frequency of at least 100 KHz.

2. The sensor bus system according to claim 1, wherein the plurality of sensors include:
acceleration sensors, and/or
near range radar sensors.

3. The sensor bus system according to claim 1, wherein the I/Q modulation
includes PSK (Phase Shift Keying) or QPSK (Quadrature Phase Shift Keying) or 8-PSK or 16-PSK or DPSK (Differential Phase Shift Keying), and/or
includes a quadrature amplitude modulation.

4. The sensor bus system according to claim 1, further comprising an equalizer in a reception path of the electronic controller and/or in a transmission path of the plurality of sensors, the equalizing being set up to compensate an attenuation of the twisted two-wire line.

5. The sensor bus system according to claim 1, wherein the plurality of sensors are configured to transmit, during reception of signals, the received environmental information to the electronic controller via the twisted two-wire line in the I/Q-modulated manner.

6. The sensor bus system according to claim 1, wherein the electronic controller is configured to transmit an amplitude-modulated carrier signal to the plurality of sensors via the twisted two-wire line, and the plurality of sensors are configured to transmit the received environmental information via the amplitude-modulated carrier signal synchronously in the I/Q-modulated manner to the electronic controller via the twisted two-wire line.

7. The sensor bus system according to claim 1, wherein the plurality of sensors are configured to transmit the received environmental information, in a time-division multiplex method and/or in a frequency multiplex method, to the electronic controller via the twisted two-wire line in the I/Q-modulated manner.

8. The sensor bus system according to claim 1, wherein the electronic controller is configured to assign to the plurality of sensors a corresponding time window, dynamically, within which time window the plurality of sensors are permitted to transmit the received environmental information via the twisted two-wire line.

9. A sensor bus system comprising:
an electronic controller;
a plurality of sensors; and
a twisted two-wire line between the electronic controller and the plurality of sensors, wherein the electronic controller configured to supply the plurality of sensors with electrical energy via the twisted two-wire line, and wherein the plurality of sensors are configured to transmit received information to the electronic controller in an I/Q (in-phase/quadrature)-modulated manner via the twisted two-wire line,
wherein each of the plurality of sensors stores a data set representing preconfigured behaviors with respect to:
transmission of measurement signals into an environment, and/or
reception of echoes of the measurement signals, and/or
transmission of the received information, in a sensor-specific manner, as raw data or as echo data evaluated in the sensor, which echo data in each case be selectively activated using the electronic controller.

10. A method for data transmission in a sensor bus system, in which a plurality of sensors and an electronic controller are connected to one another in terms of information by a twisted two-wire line, the method comprising the following steps:
supplying electrical energy to the plurality of sensors by the electronic controller via the twisted two-wire line;
receiving information by the plurality of sensors;
I/Q (in-phase/quadrature) modulating the information in the plurality of sensors; and
transmitting the I/Q-modulated information from the plurality of sensors to the electronic controller via the twisted two-wire line,
wherein the twisted two-wire line connects the electronic controller and the plurality of sensors via a ring structure or a linear structure, in terms of information technology and energy,
wherein the plurality of sensors include ultrasonic sensors,
wherein the I/Q modulation uses a fundamental frequency of at least 100 KHz.

11. The method according to claim 10, wherein the plurality of sensors and the electronic controller are connected to one another in terms of information in a linear or ring-shaped manner by the twisted two-wire line.

* * * * *